United States Patent [19]

Nakamura et al.

[11] Patent Number: 5,070,291
[45] Date of Patent: Dec. 3, 1991

[54] CONNECTION SWITCHING APPARATUS FOR THREE-PHASE INDUCTION MOTOR

[75] Inventors: Kosei Nakamura; Kazuhisa Numai, both of Yamanashi, Japan

[73] Assignee: Fanuc Ltd., Yamanashi, Japan

[21] Appl. No.: 393,918

[22] PCT Filed: Dec. 16, 1988

[86] PCT No.: PCT/JP88/01277
§ 371 Date: Aug. 4, 1989
§ 102(e) Date: Aug. 4, 1989

[87] PCT Pub. No.: WO89/06065
PCT Pub. Date: Jun. 29, 1989

[30] Foreign Application Priority Data

Dec. 17, 1987 [JP] Japan ............... 62-317472

[51] Int. Cl.[5] .................................. H02P 7/48
[52] U.S. Cl. .................... 318/771; 318/773; 318/812; 318/778
[58] Field of Search ................ 318/727–819

[56] References Cited

U.S. PATENT DOCUMENTS

| 1,072,132 | 9/1913 | Lutz | 318/778 |
| 1,163,268 | 12/1915 | Schwarz | 318/778 X |
| 1,467,745 | 9/1923 | Zederbohm | 318/771 |
| 1,628,464 | 5/1927 | Hobart | 318/784 X |
| 1,778,976 | 10/1930 | Hunter | 318/771 X |
| 2,182,646 | 12/1939 | Shutt | 318/771 |
| 2,317,266 | 4/1943 | Galt, Jr. | 318/771 |
| 2,419,268 | 4/1947 | Lewis | 318/777 |
| 2,806,195 | 9/1957 | Egglestone | 318/778 |
| 2,959,721 | 11/1960 | Butler et al. | 318/766 X |
| 3,378,755 | 4/1968 | Sawyer | 318/771 X |
| 4,516,664 | 5/1985 | Anzai et al. | 318/807 X |
| 4,656,572 | 4/1987 | Caputo et al. | 318/811 X |
| 4,736,148 | 4/1988 | Hirata | 318/812 |
| 4,763,060 | 8/1988 | Takahashi | 318/811 |
| 4,772,996 | 9/1988 | Hanei et al. | 318/811 X |

FOREIGN PATENT DOCUMENTS 52-54913 5/1977 Japan .

Primary Examiner—Paul Ip
Attorney, Agent, or Firm—Armstrong, Nikaido, Marmelstein, Kubovcik & Murray

[57] ABSTRACT

Low rotational speed characteristics of a three-phase induction motor driven by a PWM inverter are improved by rapid Δ-Y connection switching by semiconductor switches (1, 2, 3, 4, 5), for example, TRIAC's.

3 Claims, 7 Drawing Sheets

Fig. 1

Fig.2(A) VOLTAGE

TO CONTROL CIRCUIT

CONNECTION SWITCHING APPARATUS FOR THREE-PHASE INDUCTION MOTOR

DESCRIPTION

1. Technical Field

This invention relates to a connection switching apparatus which performs delta (referred to hereinafter as Δ)-star (referred to hereinafter as Y) connection switching for a three-phase induction motor which is used for a machine tool, for example, a lathe, a drill, a tapper and the like.

2. Background Art

Recently, a built-in motor is formed so that an axle of the motor is connected to a work piece or a tool not through a change gear but directly so as to rotate the work piece and the tool directly when used for a machine tool such as a lathe, a drill, a tapper and the like. The motor is driven by an inverter circuit which is formed using a PWM (pulse width modulation) technique using a variable frequency, and its rotation rate is varied by varying the frequency of the output of the inverter circuit.

Figure 1:
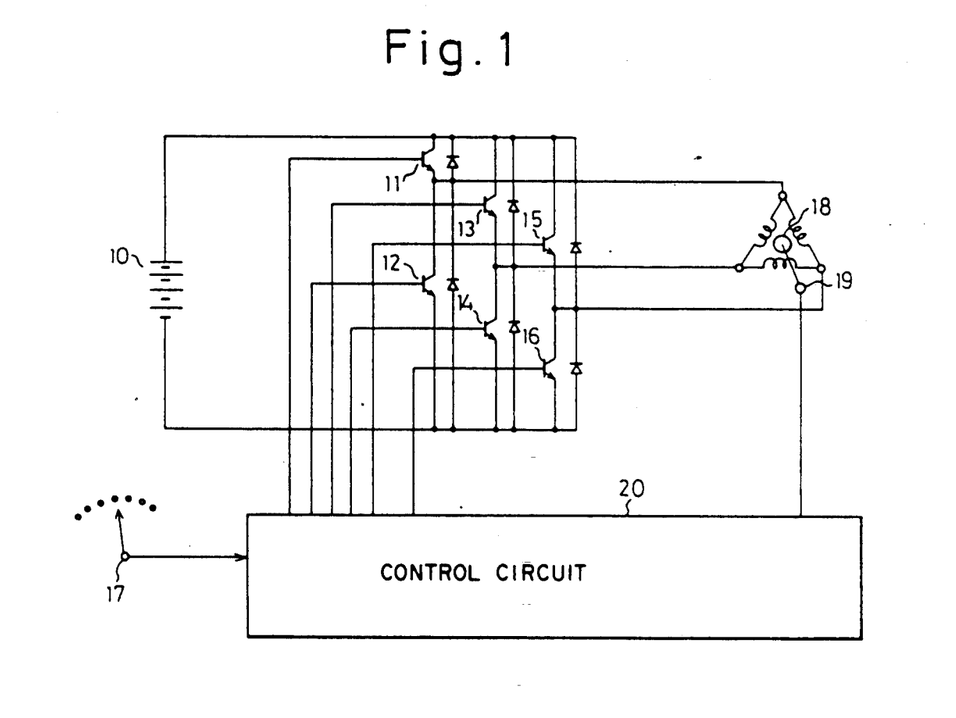
FIG. 1 is a circuit diagram of a control circuit for a three-phase induction motor using a conventional PWM inverter.
Figure 2A:
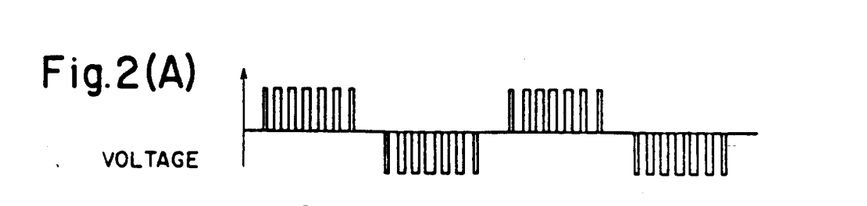
FIGS. 2a and 2b are diagrams showing a pseudo-sine wave in a PWM inverter.
Figure 2B:
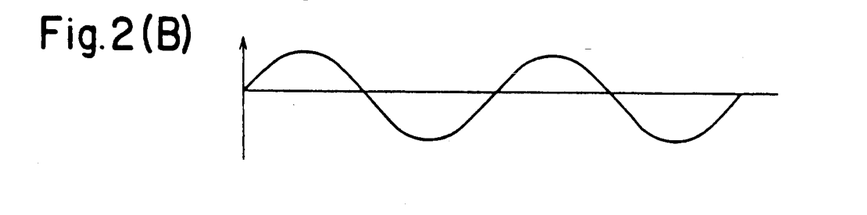

FIG. 1 represents a rotational speed control circuit for a three-phase induction motor using the PWM inverter technique. FIG. 2 represents only one-phase among the pseudo-three phase alternating current which the PWM inverter shown in FIG. 1 generates, wherein (A). shows a pseudo-sine wave and (B) shows a sine wave which the pseudo-sine wave assumes.

In FIG. 1, a direct current supplied from a direct current source 10 is switched on/off by six power transistors 11 to 16 so that the waveform of each phase becomes as shown in FIG. 2 (A) having a 120° phase difference in relation to the other phases, to generate a pseudo-three phase alternating current. The frequency and effective current of this pseudo-three-phase alternating current can be varied by varying the timing of the switching. Accordingly, the rotational speed of the three-phase induction motor can be controlled to any value by adjusting the timing of the switching based on a set rotation speed at a rotation speed setting means 17, and a real rotation speed calculated from a pulse generated in pulse generator 19 which rotates coaxially with a motor 18 so as to adjust the frequency and the effective power of the pseudo-three-phase alternating current.

Figure 3:
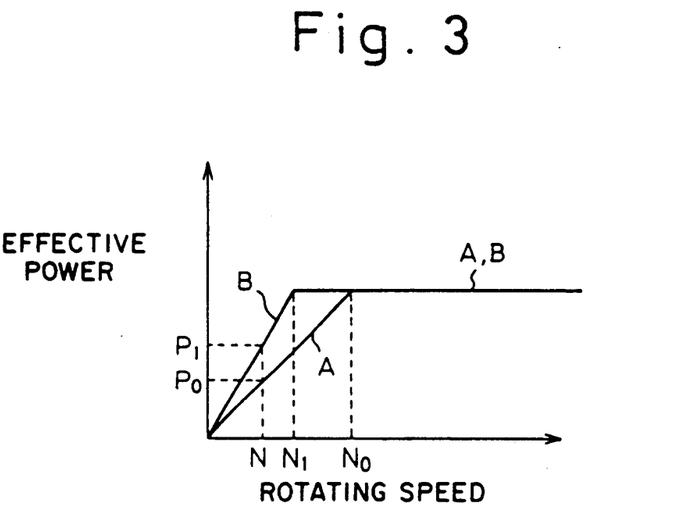
FIG. 3 is a diagram showing the relation between a rotation speed and an effective power in a Δ connection and Y connection.

FIG. 3 shows the relation between the rotation speed and the effective power. "A" represents the case where windings of the motor form a Δ connection. Referring to FIG. 3, when the rotational speed exceeds a speed $N_0$, the effective power becomes constant and independent of the rotation speed, because as the pulse width reaches its upper limit the upper limit of the power which can be supplied is also reached. When the rotational speed becomes lower than the speed $N_0$, the current flowing through the windings decreases so that the effective power decreases proportionally to the rotational speed.

In FIG. 3, "B" represents the case where the windings of the motor form a Y connection. In this case, the rotational speed $N_1$ where the effective power becomes constant is lower than the speed $N_0$ in the Δ connection. The reason is that, although the impedance of the winding in each phase in the Y connection is larger than the same in the Δ connection, the current in each phase is controlled so that the effective current becomes a predetermined value by widening the pulse width. Then, for example, at the rotational speed N shown in FIG. 3 the effective power supplied is $P_0$ in the Δ connection, while it becomes $P_1$ in the Y connection, at a value larger than $P_0$.

Figure 4:
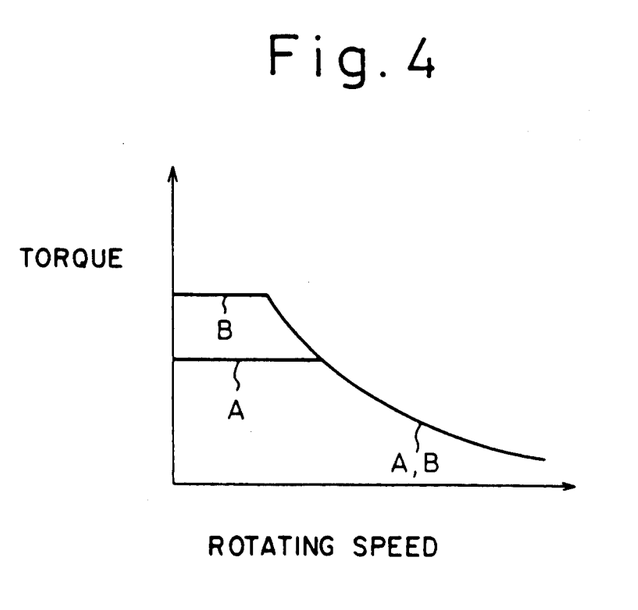
FIG. 4 is a diagram showing the relation between a rotational speed and a torque in a Δ connection and Y connection.

As there is a relation $P=kTN$ (k is a proportional constant) between torque T which a motor generates and an effective power P when a rotational speed is N, the relation between the rotational speed and the torque is as shown in FIG. 4. Therefore, it can be clearly realized that the torque obtained in the Y connection of "B" is larger than the same in the Δ connection of "A" in the region where the rotational speed is relatively low.

Conventionally, this Δ-Y connection switching has been carried out by means of a magnetic conductor requiring a considerable changeover time. The reason why so much time is required in Δ-Y connection switching is mainly that problems in switching the magnetic conductor must be avoided. Such problems being sticking of a contact due to momentary shorting of the power supply caused by a large difference in switching speed, and chattering of the contacts when switching a plurality of magnetic conductors.

Therefore, a first problem arises in that considerable switching time is needed because all of the contacts must be kept open for a considerable length of time.

Additionally, a second problem arises in that overall size and weight are increased due to the large size and weight of the magnetic conductor itself.

Accordingly, an object of the present invention is to provide a connection switching apparatus which requires a minimum amount of switching time for Δ-Y connection switching and which is small in sized and light weight.

DISCLOSURE OF THE INVENTION

Figure 5:
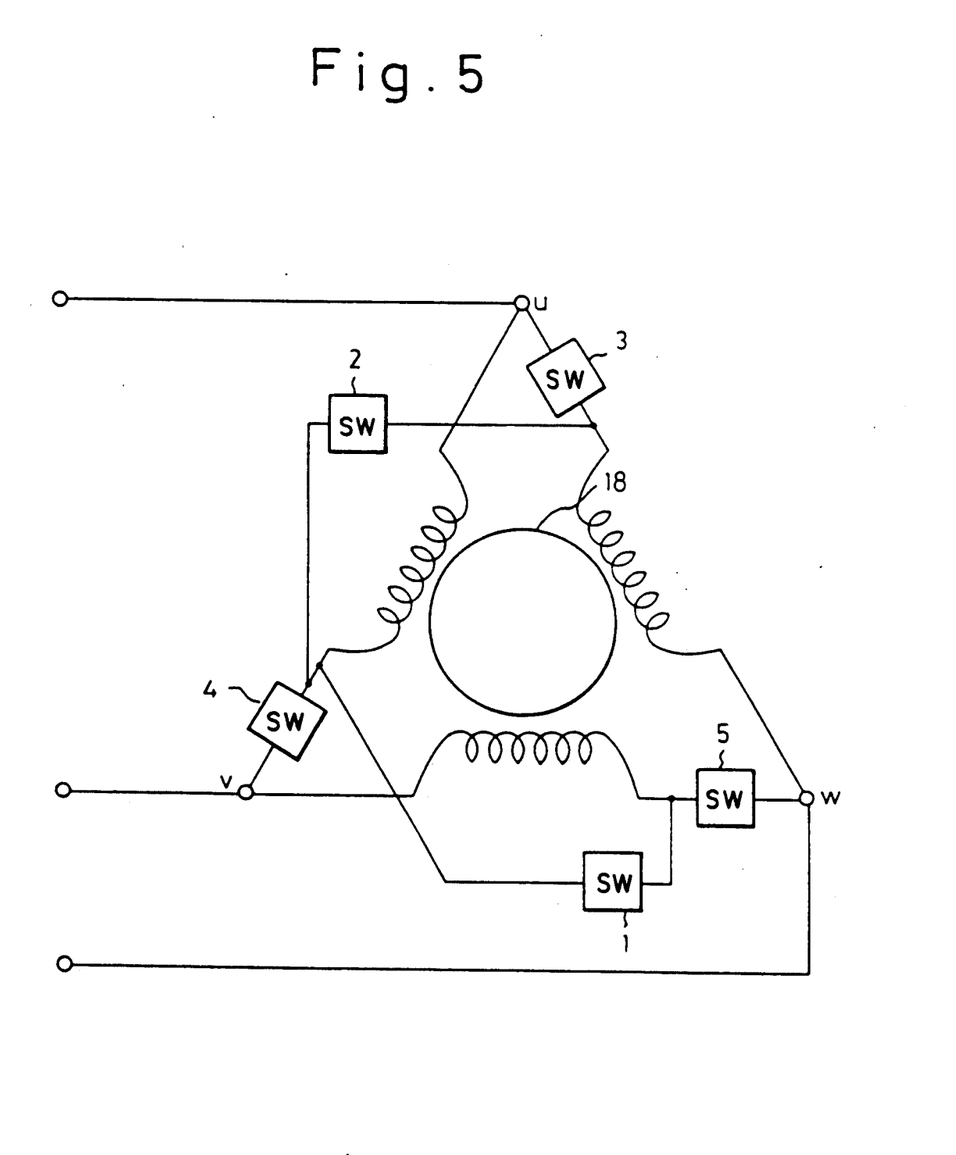
FIG. 5 is a diagram representing a basic construction of the present invention.

FIG. 5 is a diagram representing the basic construction of the present invention. In this figure, reference number 1 to 5 indicate semiconductor switches, wherein 1 and 2 are switched off while 3, 4, and 5 are switched on in a Δ connection, and 1 and 2 are switched on while 3, 4, and 5 are switched off in a Y connection. Two thyristors connected in parallel and with opposite polarity to each other, or a TRIAC can be used for these semiconductor switches.

As a semiconductor switch which essentially consists of thyristors does not chatter when switching, the time required for switching is reduced to a minimum. Additionally, as the semiconductor switch has the characteristic of not turning off until the current flowing through its elements becomes zero and reverse bias is applied thereto. Thus it can only be switched when the current flowing through the windings becomes zero, namely, when the magnetic energy remaining within the windings becomes substantially zero.

BEST MODE FOR CARRYING OUT THE INVENTION

Figure 6:
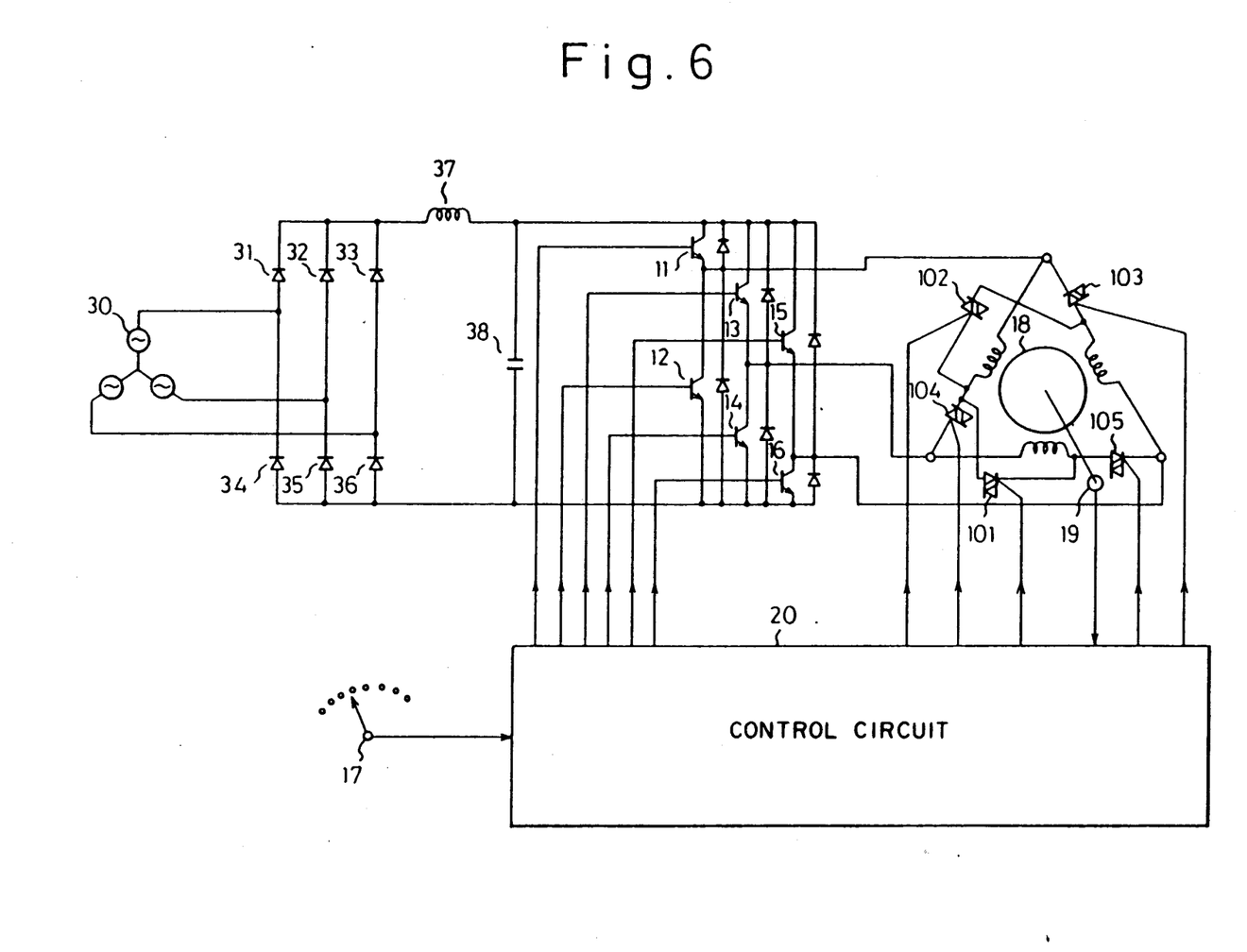
FIG. 6 is a diagram showing the first embodiment of the present invention.

FIG. 6 is a diagram showing the first embodiment of the present invention. In this embodiment, three-phase alternating current supplied from a three-phase alternating current source 30 is rectified by diodes 31 to 36 and smoothed by an inductor 37 and capacitor 38 to produce direct current. The operation of power transistors 11 to 16 is similar to those in FIG. 1, and each generates a pseudo-sine wave as shown in FIG. 2 (A) having phase difference of 120° between each other.

A rotational speed setting means 17 is provided for setting the rotational speed in the same way as shown in FIG. 1, and the rotational speed of a motor 18 is detected in pulse generator 19 and transmitted to a control circuit 20. The method of controlling the motor so as to conform the rotational speed of the motor 18 to a value set at the rotating speed setting means 17, is the same as that shown in FIG. 1.

TRIAC's 101 to 105 are switched by control circuit 20 to perform the Δ-Y connection switching.

Figure 7:
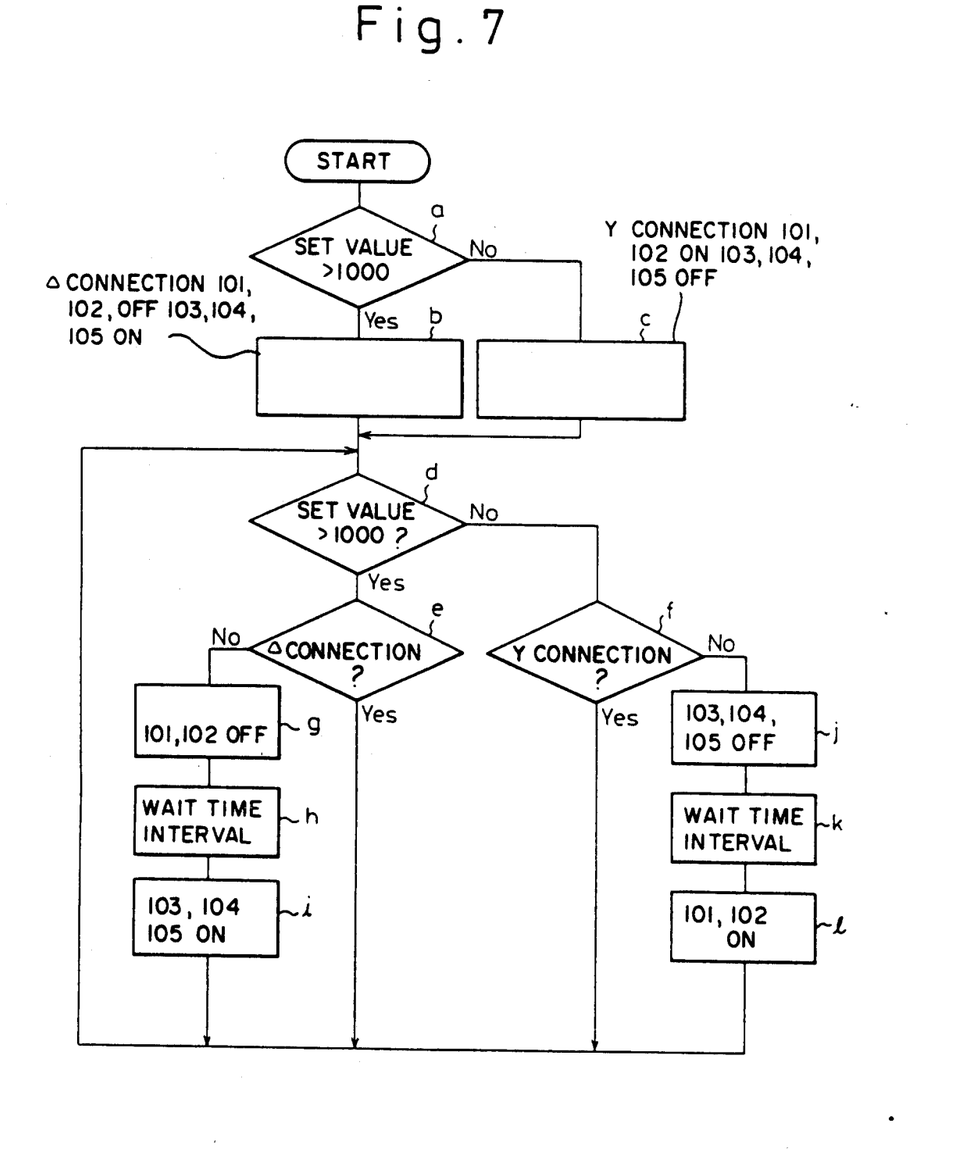
FIG. 7 is a flow chart showing Δ-Y connection switching.

The process of switching is described referring to the flow chart of FIG. 7 showing the Δ-Y connection switching process carried out by switching the TRIAC's 101 to 105.

First, whether the set rotational speed is grater than 1,000 or not is decided (step "a"). If the speed is greater than 1,000 then TRIAC's 101 and 102 are switched off and TRIAC's 103 to 105 are switched on to form a Δ connection (step "b"), and if the speed is less than 1,000 then TRIAC's 101 and 102 are switched on and TRIAC's 103 to 105 are switched off to form a Y connection (step "c").

Thereafter, if the set value changes from less than 1,000 to greater than 1,000 (step "d" and "e"), then TRIAC's 101 and 102 are switched off (step "g"), and after an adequate time interval (step "h") TRIAC's 103 to 105 are switched on to change to a Δ connection.

Conversely, if the set value changes from greater than 1,000 to less than 1,000 (step "d" and "f"), then TRIAC's 103 to 105 are switched off (step "j"), and after an adequate time interval (step "k") TRIAC's 101 and 102 are switched on to change to a Y connection.

Figure 8:
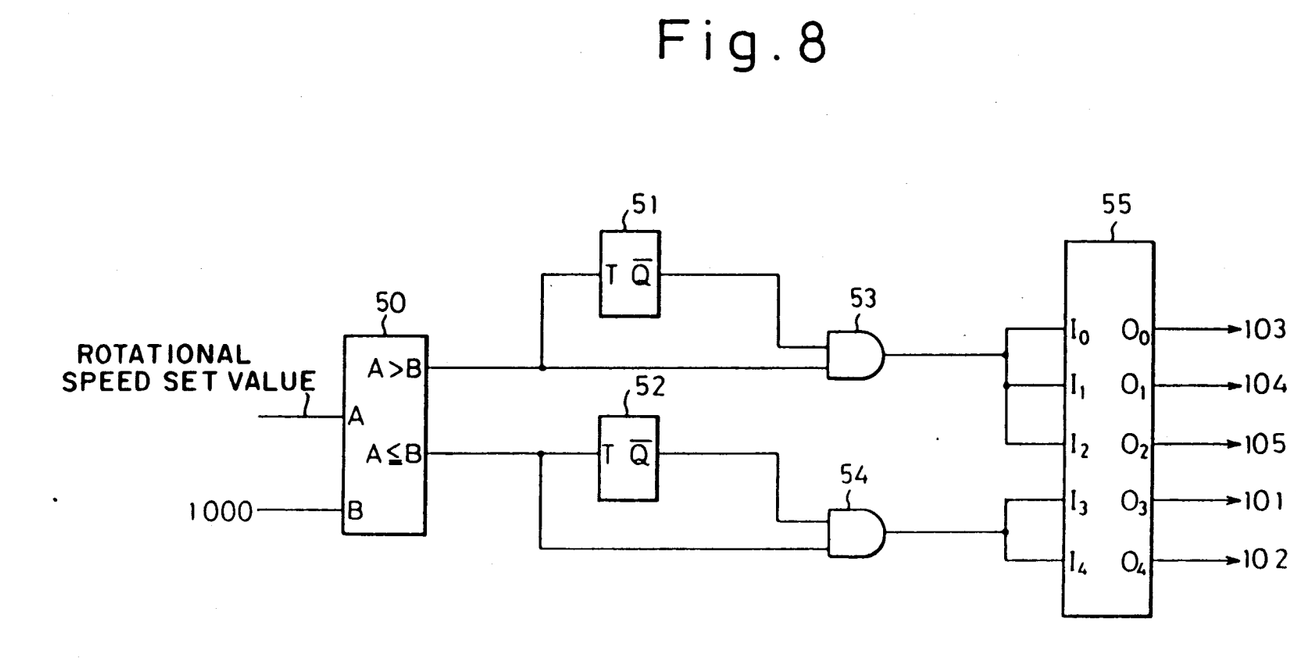
FIG. 8 is a part of the control circuit 20 shown in FIG. 6 implementing the process shown in FIG. 7.

FIG. 8 is a part of the control circuit 20 in FIG. 6 and represents an example of a circuit implementing the process shown in the flow chart of FIG. 7. A comparator 50 has one input denoted by "A" and connected to the rotational speed set output and a digital value is input thereto, and another input denoted by "B" is connected to a digital value "1,000", and the comparator 50 outputs "H" from an output denoted by "A>B" when the set rotational speed is greater than 1,000, and outputs "H" from an output denoted by "A<B" when the set rotational speed is less than 1,000. The outputs "A>B" and "A<B" are connected to trigger inputs of single shot multivibrators (referred to hereinafter as single shots) 51 and 52, respectively, which output "L" during a time interval corresponding to set time constants when the outputs "A>B" and "A<B" are changed to "H", respectively. One input of each of AND gates 53 and 54 is connected to an output of the single shots 51 and 52, respectively, and the other input of each AND gate is connected to the outputs "A>B" and "A≦B", respectively. Accordingly, the output of the AND gate 53 becomes "L" as soon as the set rotational speed changes to less than 1,000, while it becomes "H" after the time interval corresponding to the set time constants when the set rotational speed changes to greater than 1,000. On the other hand, the output of the AND gate 54 becomes "L" as soon as the set rotational speed changes to greater than 1,000, while it becomes "H" after the time interval corresponding to the set time constants when the set rotational speed changes to less than 1,000. The TRIAC driving circuit 55 outputs signals for triggering a TRIAC at each of its outputs $O_{0-4}$, while its corresponding input $I_{0-4}$ is "H". The inputs $I_{0-2}$ are all connected to the output of the AND gate 53, the inputs $I_{3-4}$ are all connected to the output of the AND gate 54, and the outputs $O_{0-5}$ are each connected to a trigger input of TRIAC 103, 104, 105, 101 and 102, respectively. The process represented in the flow chart of FIG. 7 is implemented in the aforementioned circuit.

Figure 9:
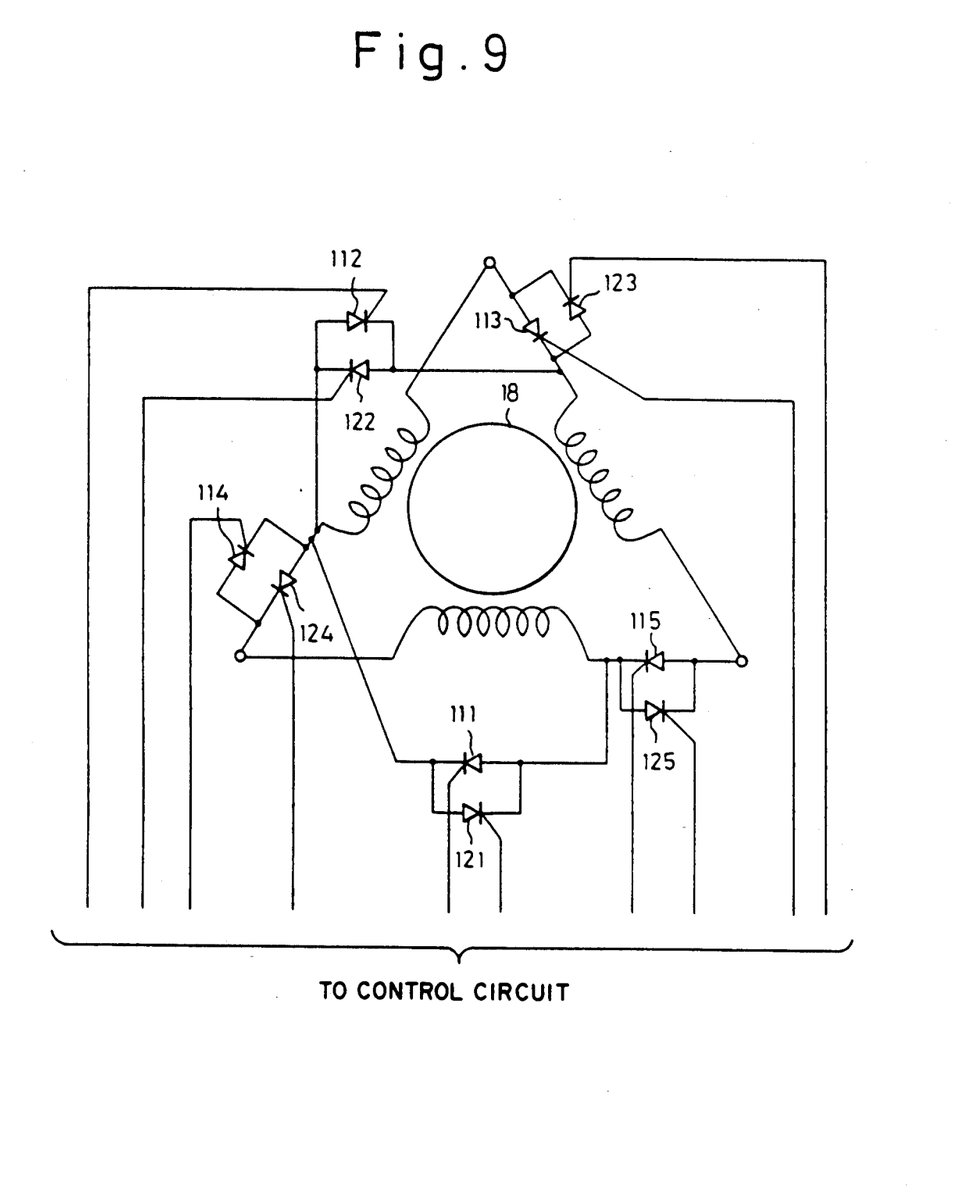
FIG. 9 is a diagram showing the second embodiment of the present invention.

FIG. 9 represents a part of a second embodiment of the present invention. In this embodiment, pairs of thyristors 111 and 121, 112 and 122, 113 and 123, 114 and 124, and 115 and 125 are used instead of the TRIAC's 101 to 105 shown in FIG. 6, and the other elements are the same as the embodiment shown in FIG. 6.

In this embodiment, although the complexity is slightly increased because there are twice as many wires, i.e., 10 wires for controlling the semiconductor switches as in the embodiment of FIG. 6, there is an advantage in that a larger current can be controlled.

As mentioned above, in accordance with the present invention, an automatic control wherein a Y connection where large torque is obtained is selected at a low rotational speed, while a Δ connection is selected at a high rotational speed can be realized. For example, applying the present invention to a lathe, heavy cutting is carried out with a large torque at a low rotational speed, and the rotational speed can be rapidly changed to a high speed to finish at the high rotational speed by merely altering the set rotational speed.

Additionally, as the circuit for driving the TRIAC's or the thyristors can be integrated into a conventional control circuit, and since TRIAC's or thyristors per se are small sized and light weight, the size or weight of the whole apparatus is not greatly increased.

While the invention has been particularly shown and described in reference to preferred embodiments thereof, it will be understood by those skilled in the art that changes in form and details may be made therein without departing from the spirit and scope of the invention.

TABLE OF REFERENCE NUMBERS AND PARTS

| | |
|---|---|
| 1 to 5 | semiconductor switch |
| 10 | direct current source |
| 11 to 16 | power transistor |
| 17 | rotational speed setting means |
| 18 | three-phase induction motor |
| 19 | pulse generator |
| 20 | control circuit |
| 30 | three-phase alternating current source |
| 31 to 36 | diode |
| 37 | inductor |
| 38 | capacitor |

| | -continued |
|---|---|
| 50 | comparator |
| 51, 52 | single shot multivibrator |
| 53, 54 | AND gate |
| 55 | TRIAC driving circuit |
| 101 to 105 | TRIAC |
| 111 to 115, 112 to 125 | thyristor |

We claim:

1. A driving apparatus for a three-phase induction motor comprising:

an inverter for converting direct current into a three-phase alternating current having a variable frequency to be supplied to said three-phase motor;

a rotational speed setting means for setting a target rotational speed of said three-phase induction motor;

an inverter control circuit connected to said inverter and said rotational speed setting means for controlling the frequency of said three-phase alternating current so that a rotational speed of said three-phase induction motor coincides with said target rotational speed; and a connection switching circuit connected to said inverter and said inverter control circuit having a first switch group and a second switch group, and forming a delta connection for said three-phase induction motor by switching off said first switch group and switching on said second switch group when said target rotational speed set by said rotational speed setting means is greater than a pre-set value, and forming a star connection for said three-phase induction motor by switching on said first switch group and switching off said second switch group when said target rotational speed set by said rotational speed setting means is less than said pre-set value, said first and second switch groups having semiconductor switches.

2. A driving apparatus as claimed in claim 1, wherein said semiconductor switch consists of two thyristors connected in parallel and with opposite polarity to each other.

3. A driving apparatus as claimed in claim 1 wherein said semiconductor switch consists of a TRIAC.

* * * * *